US012360536B2

(12) United States Patent  
Kulangara Muriyil et al.

(10) Patent No.: US 12,360,536 B2  
(45) Date of Patent: Jul. 15, 2025

(54) METHOD AND SYSTEM OF DYNAMIC LOCALIZATION OF A TELEPRESENCE ROBOT BASED ON LIVE MARKERS

(71) Applicant: Tata Consultancy Services Limited, Mumbai (IN)

(72) Inventors: Robin Tommy Kulangara Muriyil, Thiruvananthapuram (IN); Swapnil Kalhapure, Thiruvananthapuram (IN)

(73) Assignee: Tata Consultancy Services Limited, Mumbai (IN)

( * ) Notice: Subject to any disclaimer, the term of this patent is extended or adjusted under 35 U.S.C. 154(b) by 451 days.

(21) Appl. No.: 17/817,318

(22) Filed: Aug. 3, 2022

(65) Prior Publication Data

US 2023/0072471 A1 Mar. 9, 2023

(30) Foreign Application Priority Data

Aug. 4, 2021 (IN) .............................. 202121035199

(51) Int. Cl.
  *G05D 1/00* (2024.01)
  *H04B 17/318* (2015.01)
  *H04W 4/40* (2018.01)

(52) U.S. Cl.
  CPC ......... *G05D 1/0234* (2013.01); *G05D 1/0038* (2013.01); *G05D 1/0212* (2013.01);
  (Continued)

(58) Field of Classification Search
  CPC .. G05D 1/0234; G05D 1/0038; G05D 1/0212; G05D 1/0274; H04W 4/40
  See application file for complete search history.

(56) References Cited

U.S. PATENT DOCUMENTS

2007/0150097 A1 6/2007 Chae et al.
2017/0201617 A1 7/2017 So et al.
(Continued)

FOREIGN PATENT DOCUMENTS

EP 1517210 A2 3/2005

OTHER PUBLICATIONS

Andrej Babineca et al., "Visual localization of mobile robot using artificial markers," Procedia Engineering, 2014, vol. 96, pp. 1-9, Publisher: Science Direct, https://www.sciencedirect.com/sdfe/reader/pii/S1877705814031427/pdf.
(Continued)

*Primary Examiner* — Ig T An
(74) *Attorney, Agent, or Firm* — Finnegan, Henderson, Farabow, Garrett & Dunner, LLP

(57) ABSTRACT

Currently teleconferencing robotic systems available are not smart and unable to navigate based on specific path and fail to focus on presenter based on overall environment. This disclosure relates to method of dynamic localization of a telepresence robot based on plurality of live markers. A plurality of images is received from an image capturing device connected to the telepresence robot. The plurality of images is processed to identify the plurality of live markers in a path of the telepresence robot. A binary matrix is decoded to identify at least one identifier (ID) associated with the at least one live marker from the plurality of live markers. A plurality of parameters is identified based on the at least one ID associated with the at least one live marker. A further path is dynamically localized to navigate the telepresence robot based on the plurality of parameters and the plurality of live markers.

20 Claims, 7 Drawing Sheets

(52) U.S. Cl.
CPC ......... *G05D 1/0274* (2013.01); *H04B 17/318* (2015.01); *H04W 4/40* (2018.02)

(56) References Cited

U.S. PATENT DOCUMENTS

| | | | |
|---|---|---|---|
| 2017/0225891 | A1 | 8/2017 | Elazary et al. |
| 2017/0344532 | A1 | 11/2017 | Zhou et al. |
| 2019/0120967 | A1* | 4/2019 | Smits ................. G01C 21/3626 |
| 2019/0278288 | A1* | 9/2019 | Xiong ................. G05D 1/0274 |
| 2020/0316786 | A1* | 10/2020 | Galluzzo ................. B25J 9/162 |
| 2020/0363782 | A1* | 11/2020 | Saur ....................... A61B 90/39 |
| 2021/0333797 | A1* | 10/2021 | Yu ........................ G05D 1/0225 |

OTHER PUBLICATIONS

Zuzana Mikulova et al., "Localization of mobile robot using visual system," Research Article, Oct. 2017, Sage Journal, https://journals.sagepub.com/doi/pdf/10.1177/1729881417736085.

Ernesto Rivas et al., "Image-Based Navigation for the SnowEater Robot Using a Low-Resolution USB Camera," Robotics, 2015, vol. 4 (2), MDPI, https://www.mdpi.com/2218-6581/4/2/120.

\* cited by examiner ously fixed setup. Existing
METHOD AND SYSTEM OF DYNAMIC LOCALIZATION OF A TELEPRESENCE ROBOT BASED ON LIVE MARKERS

PRIORITY CLAIM

This U.S. patent application claims priority under 35 U.S.C. § 119 to: India Application No. 202121035199, filed on Aug. 4, 2021. The entire contents of the aforementioned application are incorporated herein by reference.

TECHNICAL FIELD

This disclosure relates generally to telepresence robots, and, more particularly, to a method and system of dynamic localization of a telepresence robot based on live markers.

BACKGROUND

In current scenario, creating video conference (Vcon) facilities are expensive and are always fixed setup. Existing systems are not able to follow the entire teleconferencing setup based on location and are not sufficiently intelligent. Also, there are situations where location-based intelligence and awareness is required for the video conference. Interaction with the moving robot may give more flexibility in operation. However, currently available teleconferencing robotic systems are not smart. These also fail to navigate based on specific path and are unable to focus on the presenter based on overall environment.

SUMMARY

Embodiments of the present disclosure present technological improvements as solutions to one or more of the above-mentioned technical problems recognized by the inventors in conventional systems. For example, in one aspect, a processor implemented method of dynamic localization of a telepresence robot based on a plurality of live markers is provided. The processor implemented method includes at least one of: receiving, via one or more hardware processors, a plurality of images from an image capturing device connected to the telepresence robot; processing, via the one or more hardware processors, the plurality of images to identify the plurality of live markers in a path of the telepresence robot; decoding, via the one or more hardware processors, a binary matrix to identify at least one identifier (ID) associated with the at least one live marker from the plurality of live markers; identifying, via the one or more hardware processors, a plurality of parameters based on the at least one identifier (ID) associated with the at least one live marker; and dynamically localizing, via the one or more hardware processors, a further path to navigate the telepresence robot based on the plurality of parameters and the plurality of live markers. The plurality of parameters corresponds to at least one: (a) a size, (b) a location, or (c) an orientation.

In an embodiment, the binary matrix corresponds to a location of at least one live marker in the static map. In an embodiment, the static map is a usual path map for navigation of the telepresence robot. In an embodiment, the at least one of the orientation and the position of the plurality of live markers received in the telepresence robot by an electronic paper display of a display marker unit. In an embodiment, the at least one live marker changes at least one content to orient the telepresence robot into a required trajectory. In an embodiment, an information associated with the change in orientation of the telepresence robot is communicated to at least one neighboring marker to dynamically change associated marker contents to further navigate the telepresence robot in a right direction. In an embodiment, the associated marker contents correspond to simple information regarding the path, activity mapping, and information to process on next location. In an embodiment, the telepresence robot is a differential robot that navigates based on a difference in a plurality of velocities between two drive wheels. In an embodiment, further comprises, communicating, via the one or more hardware processors, a request to the display marker unit to triangulate the location of the telepresence robot, using a received signal strength indicator value (RSSI) for a wireless link between the plurality of live markers and the telepresence robot. In an embodiment, a failure detection in the display marker unit enables at least one neighboring marker to redirect a motion plan and a content flow of the telepresence robot to an alternate path computed based on a plurality of constraints. In an embodiment, the plurality of constraints corresponds to at least one of (a) an interaction results, and (b) an optimal distance to be travelled between the display marker units.

In another aspect, there is provided a system to dynamically localize a telepresence robot based on a plurality of live markers. The system comprises a memory storing instructions; one or more communication interfaces; and one or more hardware processors coupled to the memory via the one or more communication interfaces. The one or more hardware processors are configured by the instructions to: receive a plurality of images from an image capturing device connected to the telepresence robot; process the plurality of images to identify the plurality of live markers in a path of the telepresence robot; decode, a binary matrix to identify at least one identifier (ID) based on the at least one identifier (ID) associated with the at least one live marker; identify a plurality of parameters associated with the plurality of live markers; and dynamically localize a further path to navigate the telepresence robot based on the plurality of parameters and the plurality of live markers. The plurality of parameters corresponds to at least one: (a) a size, (b) a location, or (c) an orientation.

In an embodiment, the binary matrix corresponds to a location of at least one live marker in the static map. In an embodiment, wherein the static map is a usual path map for navigation of the telepresence robot. In an embodiment, the at least one of the orientation and the position of the plurality of live markers received in the telepresence robot by an electronic paper display of a display marker unit. In an embodiment, at least one live marker changes at least one content to orient the telepresence robot into a required trajectory. In an embodiment, an information associated with the change in orientation of the telepresence robot is communicated to at least one neighboring marker to dynamically change associated marker contents to further navigate the telepresence robot in a right direction. In an embodiment, the associated marker contents correspond to simple information regarding the path, activity mapping, and information to process on next location. In an embodiment, the telepresence robot is a differential robot that navigates based on a difference in a plurality of velocities between two drive wheels. In an embodiment, the one or more hardware processors are further configured by the instructions to: communicate a request to the display marker unit to triangulate a location of the robot, using a received signal strength indicator value (RSSI) for a wireless link between the plurality of live markers and the telepresence robot. In an embodiment, a failure detection in the display marker unit enables at least one neighboring marker to redirect a motion plan and a content flow of the telepresence robot to an alternate path computed based on a plurality of constraints. In an embodiment, the plurality of constraints corresponds to at least one of (a) an interaction results, and (b) an optimal distance to be travelled between the display marker units.

In yet another aspect, there are provided one or more non-transitory machine readable information storage mediums comprising one or more instructions which when executed by one or more hardware processors causes at least one of: receiving, a plurality of images from an image capturing device connected to the telepresence robot; processing, the plurality of images to identify the plurality of live markers in a path of the telepresence robot; decoding, a binary matrix to identify at least one identifier (ID) associated with the at least one live marker from the plurality of live markers; identifying, a plurality of parameters based on the at least one identifier (ID) associated with the at least one live marker; and dynamically localizing, via the one or more hardware processors, a further path to navigate the telepresence robot based on the plurality of parameters and the plurality of live markers. The plurality of parameters corresponds to at least one: (a) a size, (b) a location, or (c) an orientation.

In an embodiment, the binary matrix corresponds to a location of at least one live marker in the static map. In an embodiment, the static map is a usual path map for navigation of the telepresence robot. In an embodiment, the at least one of the orientation and the position of the plurality of live markers received in the telepresence robot by an electronic paper display of a display marker unit. In an embodiment, at least one live marker changes at least one content to orient the telepresence robot into a required trajectory. In an embodiment, the information associated with the change in orientation of the telepresence robot is communicated to at least one neighboring marker to dynamically change associated marker contents to further navigate the telepresence robot in a right direction. In an embodiment, the associated marker contents correspond to simple information regarding the path, activity mapping, and information to process on next location. In an embodiment, the telepresence robot is a differential robot that navigate based on a difference in a plurality of velocities between two drive wheels. In an embodiment, further comprising, communicating, via the one or more hardware processors, a request to the display marker unit to triangulate a location of the telepresence robot, using a received signal strength indicator value (RSSI) for a wireless link between the plurality of live markers and the telepresence robot. In an embodiment, a failure detection in the display marker unit enables at least one neighboring marker to redirect a motion plan and a content flow of the telepresence robot to an alternate path computed based on a plurality of constraints. In an embodiment, the plurality of constraints corresponds to at least one of (a) an interaction results, and (b) an optimal distance to be travelled between the display marker units.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
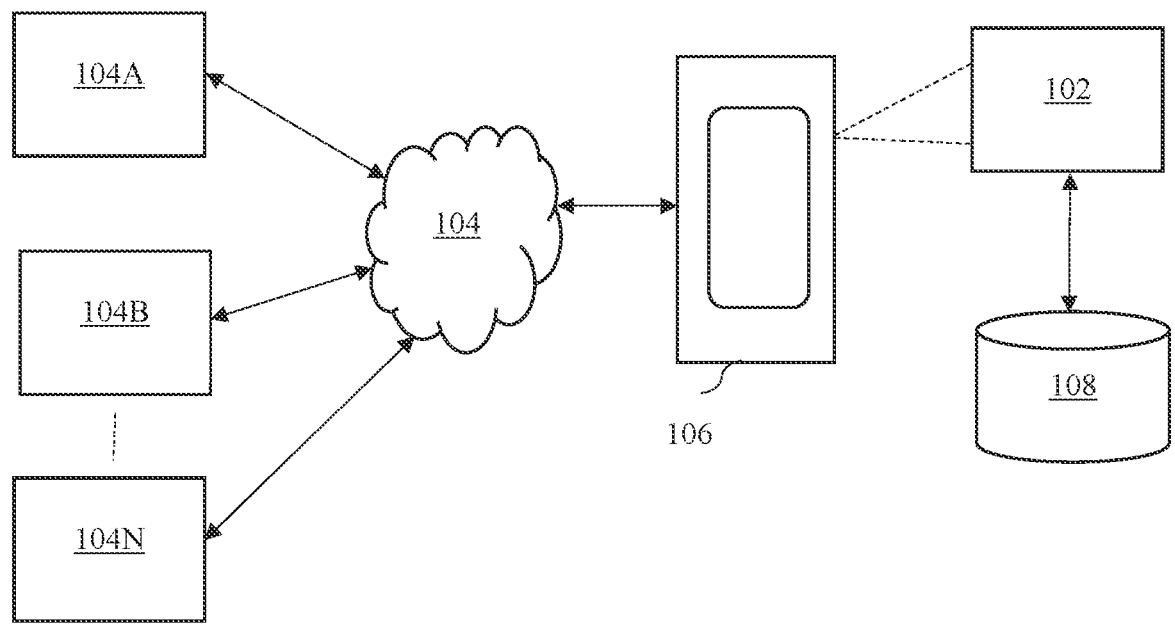
FIG. 1 illustrates a network implementation of a system for dynamic localization of a telepresence robot based on one or more live markers, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates a network implementation 100 of a system 102 for dynamic localization of a telepresence robot based on one or more live markers, according to an embodiment of the present disclosure. The system is adapted to dynamically localize the telepresence robot based on the one or more live markers. Although the present subject matter is explained considering that the system 102 is implemented for dynamically localize the telepresence robot based on the one or more live markers and may be understood that the system 102 may not be restricted to any specific machine, or environment. In an embodiment, the system 102 are implemented in a variety of computing systems, such as laptop computers, notebooks, hand-held devices, workstations, mainframe computers, servers, a network cloud, a smart phone, a wearable device, and the like.

Herein, the system 102 may acquire an input data for dynamically localize the telepresence robot based on the one or more live markers via one or more user devices 104-A, 104-B, . . . 104-N, collectively referred to as user devices 104 hereinafter. In an embodiment, the user devices 104 may be embodied in handheld electronic device, a mobile phone, a smartphone, a portable computer, a PDA, and so on. The user devices 104 are communicatively coupled to the system 102 through a network 104 and may be capable of providing input data to the system 102.

In one implementation, the network 104 may be a wireless network, a wired network or a combination thereof. The network 104 can be implemented as one of the different types of networks, such as intranet, local area network (LAN), wide area network (WAN), the internet, and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 104 may include a variety of network devices, including routers, bridges, servers, computing devices, storage devices, and the like.

In an embodiment, the system 102 may be embodied in the computing device 106. The system 102 may also be associated with a data repository 108 to store at least data i.e., information associated with the telepresence robot movement, hand eye gesture, content delivery, navigation around an environment from one location to another location using a display marker unit, etc. Additionally, or alternatively, the data repository 108 may be configured to store data and/or information associated with one or more live markers. The data repository 108 may be configured outside and communicably coupled to the computing device 106 embodying the system 102. Alternatively, the data repository 108 may be configured within the system 102. An example implementation of the system 102 for dynamic localization of the telepresence robot based on one or more live markers described further with reference to FIG. 2.

Figure 2:
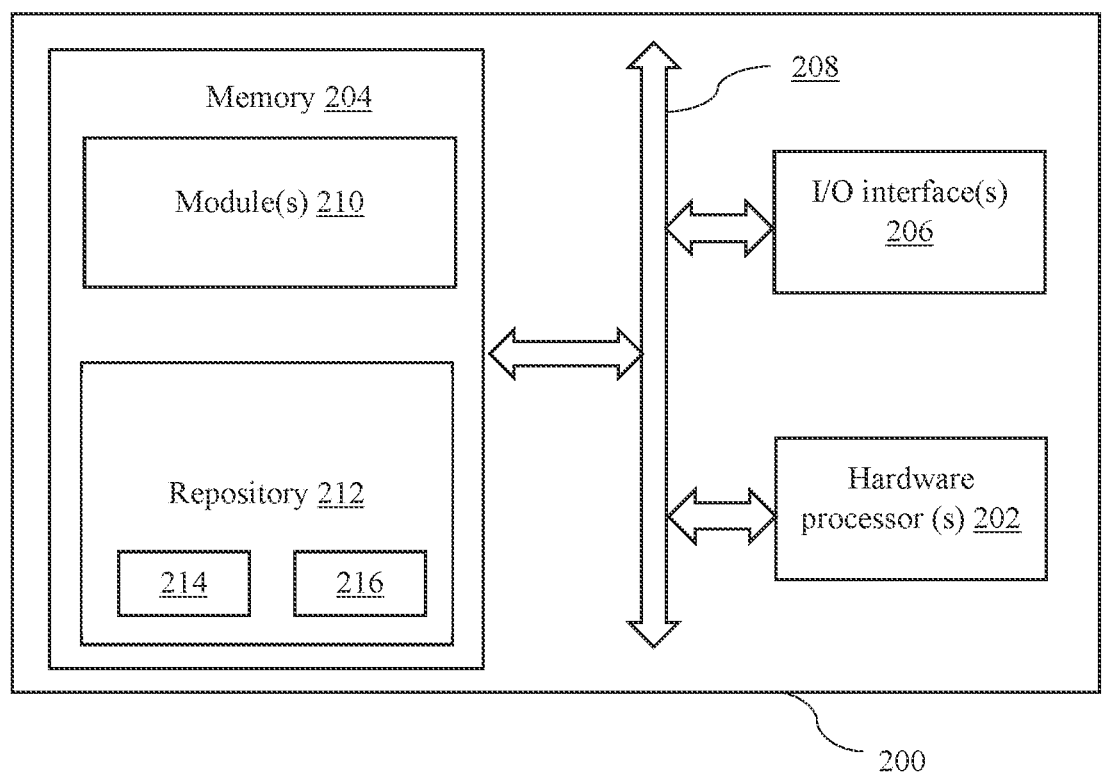
FIG. 2 illustrates a block diagram of a system for dynamic localization of the telepresence robot based on the one or more live markers, according to an embodiment of the present disclosure.

FIG. 2 illustrates a block diagram of a system 200 for dynamic localization of the telepresence robot based on the one or more live markers, according to an embodiment of the present disclosure. The system 200 may be an example of the system 102 (FIG. 1). In an example embodiment, the system 200 may be embodied in, or is in direct communication with the system, for example the system 102 (FIG. 1). In an embodiment, the system 200 includes one or more processors 202, communication interface device(s) or input/output (I/O) interface(s) 206, and one or more data storage devices or memory 204 operatively coupled to the one or more processors 202. The memory 204 comprises a database. The processor 202, memory 204, and the I/O interface 206 may be coupled by a system bus such as a system bus 208 or a similar mechanism. The one or more processors 202 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory 204.

The I/O interface device(s) 206 can include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) can include one or more ports for connecting number of devices to one another or to another server.

The memory 204 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 204 includes a plurality of modules 210 and a repository 212 for storing data processed, received, and generated by the plurality of modules 210. The plurality of modules 210 may include routines, programs, objects, components, data structures, and so on, which perform particular tasks or implement particular abstract data types.

Further, the database stores information pertaining to inputs fed to the system and/or outputs generated by the system (e.g., data/output generated at each stage of the data processing), specific to the methodology described herein. More specifically, the database stores information being processed at each step of the proposed methodology.

Additionally, the other modules 210 may include programs or coded instructions that supplement applications and functions of the system 200. The repository 212, amongst other things, includes a system database 214 and other data 216. The other data 216 may include data generated as a result of the execution of one or more modules in the module (s) 210. Herein, the memory for example the memory 204 and the computer program code configured to, with the hardware processor for example the processor 202, causes the system 200 to perform various functions described herein under.

Figure 3:
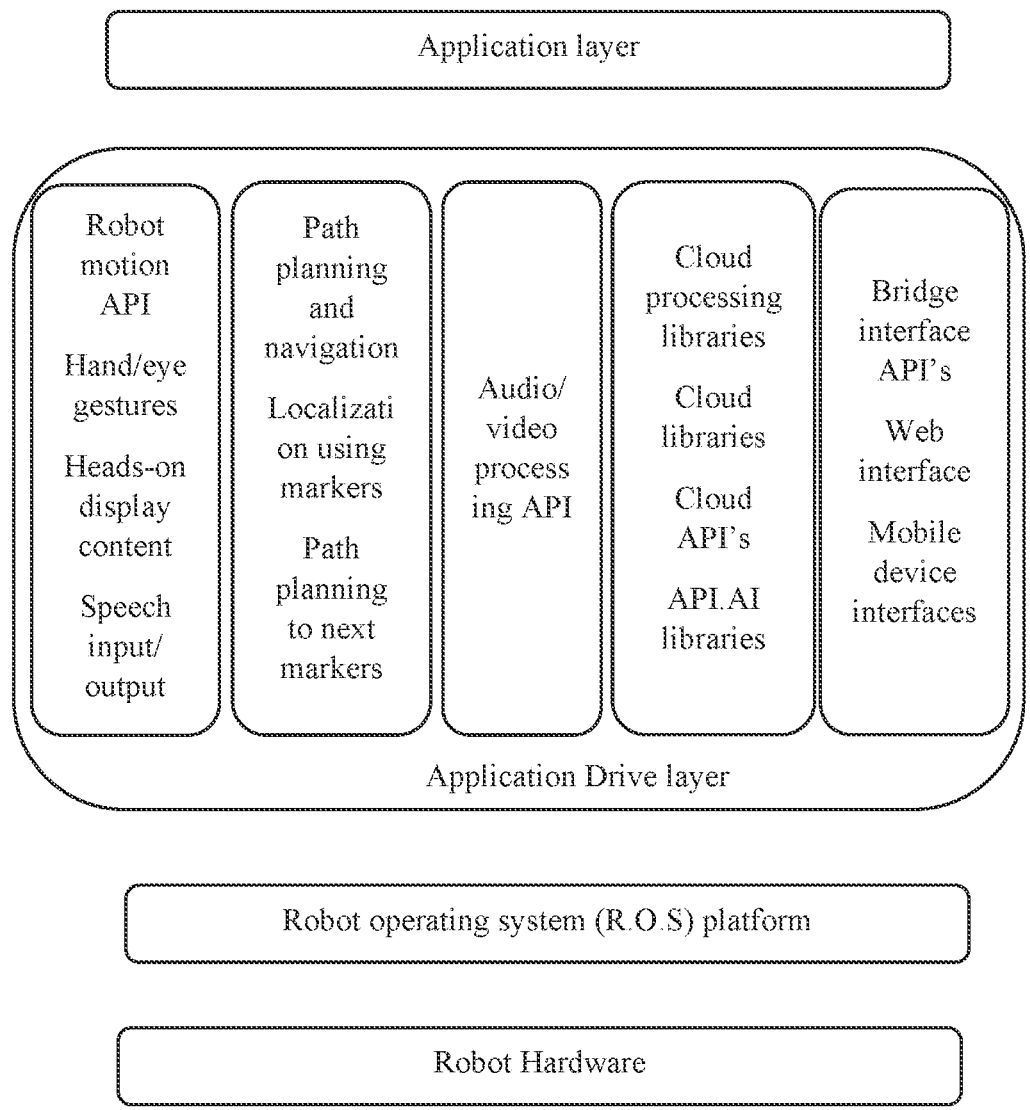
FIG. 3 illustrates an exemplary architecture block diagram of the system for dynamic localization of the telepresence robot based on the one or more live markers, according to an embodiment of the present disclosure.

FIG. 3 illustrates an exemplary architecture block diagram of the system for dynamic localization of the telepresence robot based on the one or more live markers, according to an embodiment of the present disclosure. The system 200 is divided in to plug and play modules and each module is implemented in a way that adheres to a standard framework for communication and execution. At the bottom, a robot operating system (R.O.S) framework layer is a configured for abstracting actual hardware connected to the system 200 and optimally sharing one or more hardware between one or more top nodes. In an embodiment, the one or more hardware related interfacing/data transfer required by one or more system applications running on the telepresence robot are routed through the robot operating system (R.O.S) framework layer.

An application driver layer is above the ROS layer which is an abstraction layer provide the above layer with one or more libraries, an application programming interface (API), hardware capabilities like a motion of the telepresence robot, a voice interface, a vision system, and other cloud-based interface libraries. The application driver layer enables one or more application developers with one or more tools and a documentation for building one or more software applications on the telepresence robot using the hardware capabilities, cloud-based capabilities like a chat interaction API, an image processing API, and also an autonomous navigation and an API's for path planning of the telepresence robot. An application layer is topmost layer, in which one or more final applications are running. In an embodiment, one or more users' applications runs at the application layer. The one or more applications are configured to orchestrate one or more functionalities of the at least one hardware such as a robot movement, a hand eye gesture, a content delivery, a navigation around an environment using the display marker unit, etc. The system architecture is developed in a way that ensures the system 200 can be used as a platform for customer specific requirements. Modules can be independently switched in the application driver layer, to provide optimal hardware utilization with better overall performance. The application layer uses, a mobile hybrid application development platform, which opens a window to a whole new generation of telepresence robots where one can develop hybrid apps to be deployed on the telepresence robot.

Figure 4A:
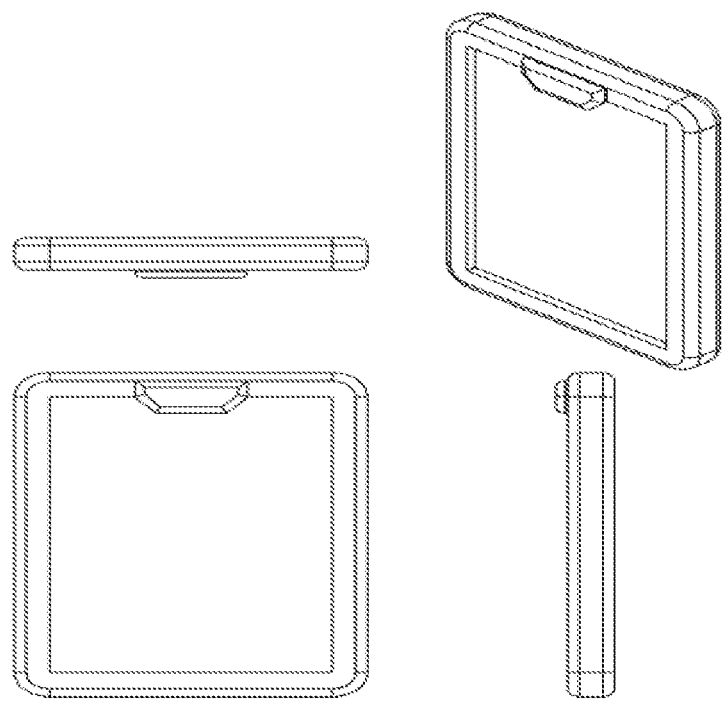
FIG. 4A illustrates an exemplary block diagram of a display marker unit, according to an embodiment of the present disclosure.
Figure 4B:
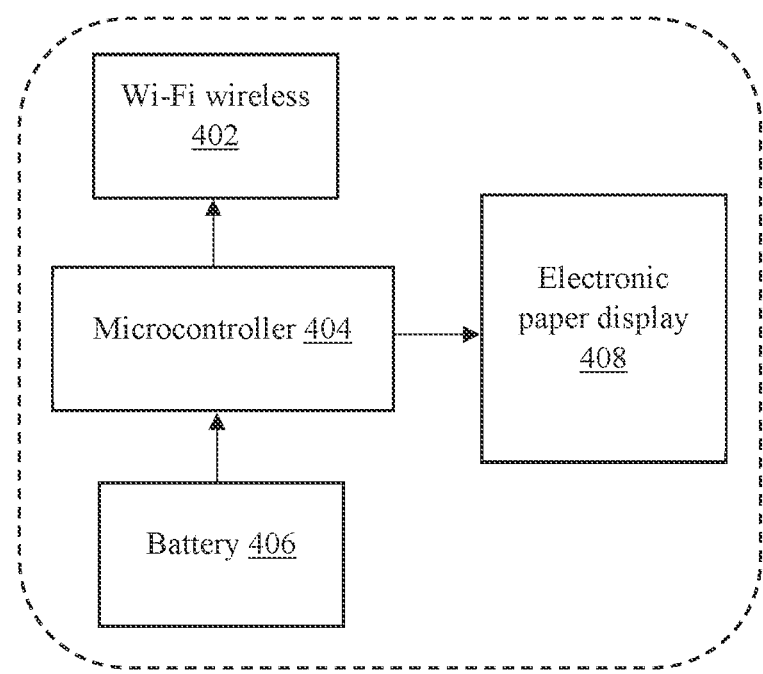
FIG. 4B illustrates an exemplary block diagram of components of the display marker unit, according to an embodiment of the present disclosure.

FIG. 4A illustrates an exemplary block diagram of a display marker unit, according to an embodiment of the present disclosure. FIG. 4B illustrates an exemplary block diagram of components of the display marker unit, according to an embodiment of the present disclosure. The display marker unit include a dedicated processing unit e.g., microcontroller 404, a battery 406, a wireless communication hardware e.g., Wi-Fi wireless 402, and an electronic paper display 408. For example, the display marker unit with certain content on a display. The contents on the marker change dynamically based on a trajectory of the telepresence robot or next goal (e.g., another location) to be reached by the telepresence robot. In an embodiment, at least one live marker changes at least one content to orient the telepresence robot into a required trajectory. The information associated with a change in orientation of the telepresence robot is communicated to at least one neighboring marker to dynamically change associated marker contents to further navigate the telepresence robot in a right direction. In an embodiment, the at least one neighboring marker is same as of the at least one live marker to control one or more activities of the telepresence robot. In an embodiment, the associated marker contents correspond to information regarding the path, activity mapping, and information to process on next location. For example, the associated marker contents are communicated though number of alphanumeric information which is decoded with a lookup table from a cloud. For example, using a minimum of three display marker units the location of the telepresence robot can be identified and a trajectory can be planned in a way after moving the telepresence robot a certain distance, a marker comes in the robot's view.

The telepresence robot is moved based on information associated with the one or more live markers. The telepresence robot is a differential robot that navigates based on the difference in one or more velocities between two drive wheels. A velocity of a right wheel and a velocity of a left wheel of the telepresence robot is given by, $$V_{left}=W*(R+L/2)$$

$$V_{right}=W*(R-L/2)$$

R is a distance between center of the telepresence robot and an Instantaneous center of curvature (ICC). The ICC is a point about which the telepresence robot rotates. L=distance between the two wheels of the telepresence robot.

If $V_{left}=V_{right}$, the telepresence robot moves in a straight line. Based on the difference between the one or more velocities of the left wheel and the right wheel the telepresence robot respectively which can move in any direction.

If the telepresence robot does not see any display marker unit, the telepresence robot can request the display marker unit to triangulate the location of the telepresence robot, using the RSSI (received signal strength indicator) value for the wireless link between the one or more live markers and the telepresence robot.

Figure 5:
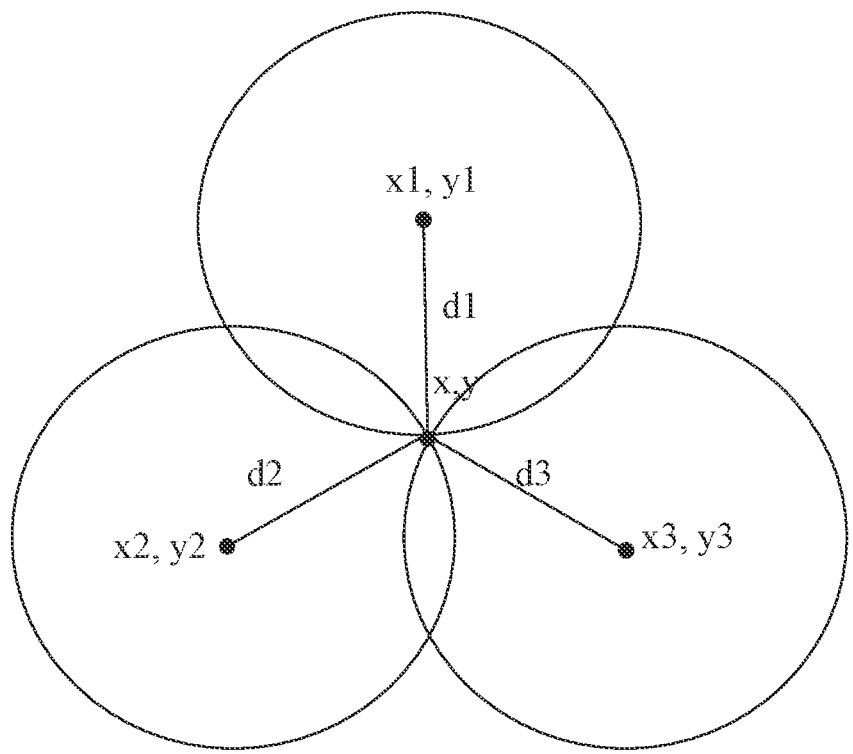
FIG. 5 is an exemplary graphical representation illustrating how three display marker units compute a location of the telepresence robot, according to an embodiment of the present disclosure.

FIG. 5 is an exemplary graphical representation illustrating how three display marker units compute a location of the telepresence robot, according to an embodiment of the present disclosure. For example, at least three display marker units are required to compute location of the telepresence robot based on trilateration. (x1, y1), (x2, y2), (x3, y3) are location of the three display marker units. $d_1$, $d_2$, $d_3$ are the distance between each display marker unit and the telepresence robot which is calculated based on the RSSI values.

$$d_i = d_0 * 10^{\wedge}(P^T - P^R)/10 \cdot \eta, \ i=1,2,3$$

$d_0$=reference distance between transmitting and receiving nodes (the display marker units and the telepresence robot)
$P^T$=Transmitted power at transmitter node
$P^R$=Transmitted power at receiver node
$\eta$=Attenuation constant.

The location of the telepresence robot (x, y) is obtained from the below three equations.

$$(x1-x)^{\wedge}2+(y1-y)^{\wedge}2=d_1^2$$

$$(x2-x)^{\wedge}2+(y2-y)^{\wedge}2=d_2^2$$

$$(x3-x)^{\wedge}2+(y3-y)^{\wedge}2=d_3^2$$

Figure 6:
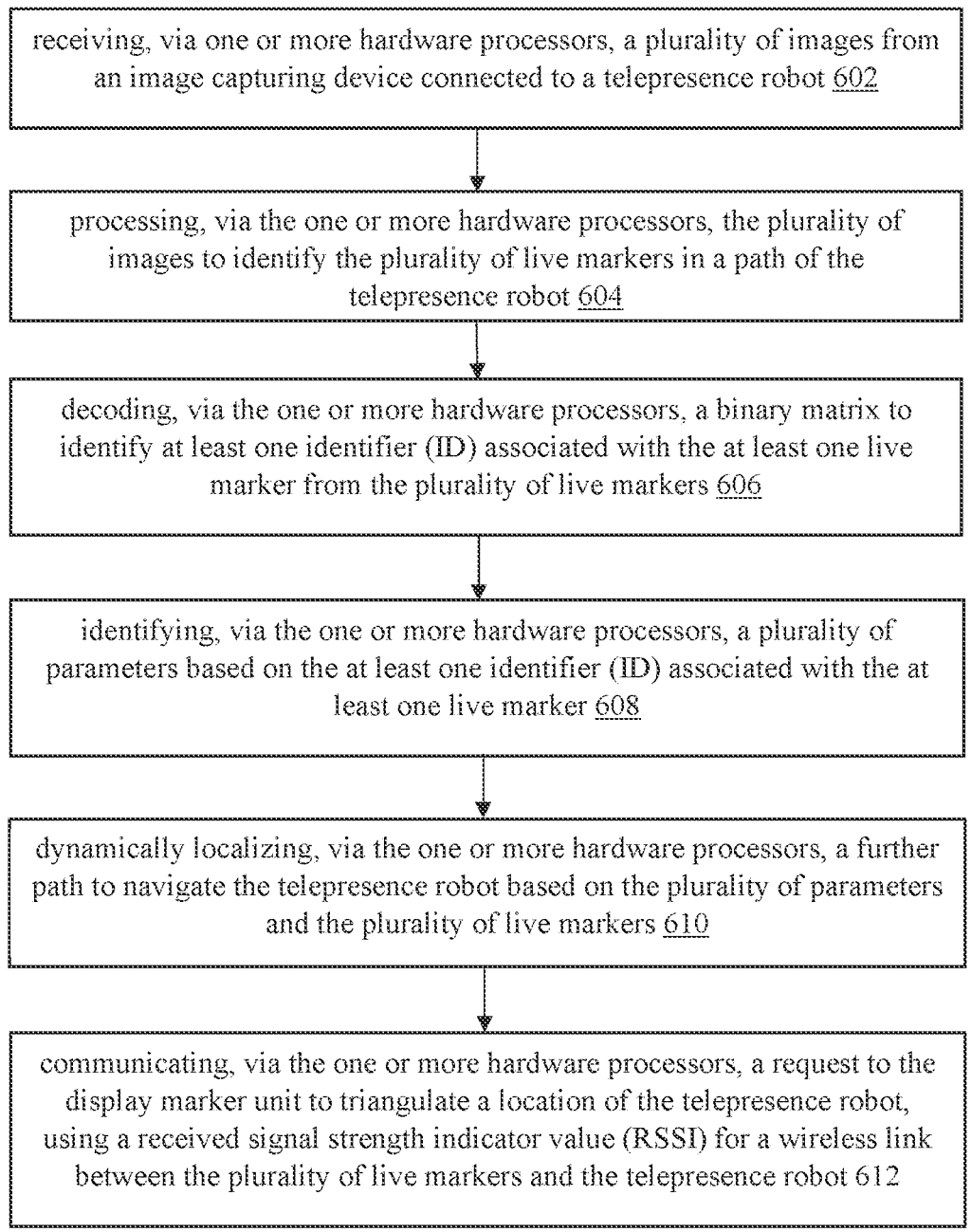
FIG. 6 is an exemplary flow diagram illustrating a method of dynamically localizing the telepresence robot based on the one or more live markers, according to an embodiment of the present disclosure.

FIG. 6 is an exemplary flow diagram illustrating a method of dynamically localizing the telepresence robot based on the one or more live markers, according to an embodiment of the present disclosure. In an embodiment, the system 200 comprises one or more data storage devices or the memory 204 operatively coupled to the one or more hardware processors 202 and is configured to store instructions for execution of steps of the method by the one or more processors 202. The flow diagram depicted is better understood by way of following explanation/description. The steps of the method of the present disclosure will now be explained with reference to the components of the system as depicted in FIGS. 2.

At step 602, one or more images are received from an image capturing device connected to the telepresence robot. At step 604, the one or more images are processed to identify the one or more live markers in a path of the telepresence robot. In an embodiment, the one or more live markers are at least one marker whose display code can be changed dynamically. For example, in a screen a quick response (QR) code is displayed for a web link and later reflect to some other content after some period. The one or more live markers are showed through a led screen and driven through a controller. The controller can be given information through a Bluetooth® or Wi-Fi based communication either by the one or more users or automatically. In an embodiment, the path is a motion area of the telepresence robot, where the camera device of the telepresence robot monitors the one or more live markers while navigation of the telepresence robot. At step 606, a binary matrix is decoded to identify at least one identifier (ID) associated with the at least one live marker from the one or more live markers. In an embodiment, the binary matrix is stored in the memory 204 but not limited to a cloud. For example, an information is read in any form from the code of the binary matrix. The binary matrix corresponds to a location of the at least one live marker in the static map. In an embodiment, the static map is a usual path map for navigation of the telepresence robot. The telepresence robot is already fed with multiple maps and a map related to the information conceived from the at least one live marker is computed from the existing information to navigate to a correct location.

At step 608, one or more parameters are identified based on the at least one identifier (ID) associated with the at least one live marker. The one or more parameters corresponds to at least one: (a) a size, (b) a location, or (c) an orientation. In an embodiment, the one or more parameters are identified based on content on the at least one live marker e.g., like process of reading the QR code. For example, the content of the at least one live marker includes one or more values which is later mapped to the look up table to understand the values. At step 610, a further path to navigate the telepresence robot is dynamically localized based on the one or more parameters and the one or more live markers. In an embodiment, the one or more parameters read from the at least one live marker is utilized to decide what is a next information that needs to be showcased to the one or more users. For example, when the telepresence robot is on a path to deliver a food to a room in a hotel and while moving back to a corresponding docking station, which sees a live marker on the path to navigate to another room to collect a bag who is checking out. Further, a receptionist instead of communicating the same directly to the telepresence robot with all the information is queued in a live QR code displayer to execute one by one based on priority by the telepresence robot. Hence, the telepresence robot observes the live marker to decide to enable the travel path.

The one or more orientations and position of the one or more live markers received in the telepresence robot by the electronic paper display 408 of the display marker unit. In an embodiment, at least one live marker changes at least one content to orient the telepresence robot into a required trajectory. In an embodiment, the information associated with the change in orientation of the telepresence robot is communicated to the at least one neighboring marker to dynamically change associated marker contents to further navigate the telepresence robot in a right direction. The path of the robot is always trained and if any change from an existing path is identified in a central server, and automatically notify an administrator and a manual intervention is performed. In an embodiment, the associated marker contents correspond to information regarding the path, activity mapping, and information to process on next location. For example, the associated marker contents are communicated though a number of alphanumeric info which is decoded with a lookup table from the cloud).

In an embodiment, a request is further communicated to the display marker unit to triangulate the location of the telepresence robot, using a received signal strength indicator value (RSSI) for a wireless link between the one or more live markers and the telepresence robot. In an embodiment, a failure detection in the display marker unit enables the one or more neighboring markers to redirect a motion plan and a flow of content at the telepresence robot to an alternate path computed based on one or more constraints. For example, if an information in at least one display marker unit is not aligned with other display marker unit, a failure is detected. The at least one display marker unit includes a previous command and a current command embedded into the at least one live marker. In an embodiment, the content corresponds to an action that the telepresence robot should perform based on the failure or change in command. In an embodiment, the one or more constraints corresponds to at least one of (a) an interaction results, and (b) an optimal distance to be travelled between the display marker units. In an embodiment, the interaction results correspond to missing of information of any live marker or misinterpretation of information of value of the at least one live marker. The telepresence robot knows distance of each display marker unit and base interaction guidelines as one or more commands are driven.

In an exemplary embodiment, the one or more dynamically marker units are connected via a wireless network to the administrator and the telepresence robot. The wireless network enables communications as well as a proximate location triangulation of the telepresence robot, if the display marker units are not in a right direction. Based on the input from the administrator, regarding a language of a content delivery and a content to be delivered by the telepresence robot, the one or more markers in the environment changes a binary matrix which convey necessary information to the telepresence robot. In an embodiment, the binary matrix corresponds to at least one of (a) markers barcodes, (b) aruco markers, and (c) Apriltags etc. In an embodiment, based on the input from the administrator, the telepresence robot delivers the content in specific language and in a specific order and simultaneously interacts with the people. If the telepresence robot learns from an interaction that a target audience is interested in very specific content or in a specific language, the telepresence robot generates one or more suggestions to the administrator regarding an update of a way the content needs to be delivered. Based on approval from the administrator's, a new language, the content, and the navigation order for the telepresence robot are updated by the display marker unit. In an embodiment, certain low-level changes, navigation changes or the delivery content changes, are dynamically managed by the wireless network of one or more display units and the telepresence robot.

For example, a presentation demo scenario where the telepresence robot is initially situated near the entrance. When a guest arrives near the telepresence robot and interacts, the telepresence robot checks for markers around (in this case i.e., Marker A) and simultaneously updates about the guest and the request query to the central server. Based on which the content on the marker A is updated by the server and the telepresence robot delivers the content in a particular flow. After content for initial place is over according to the initial request marker A redirects the telepresence robot to marker B for next content. Meanwhile, in case any other query from the guest, the server can change the content on the markers to change flow of conversation. So, in some other scenario, according to the query, the telepresence robot might be redirected from marker A to marker B directly. Example scenario like shopping malls where markers are placed for every row of shelves with items. When a user interacts with the telepresence robot regarding a query for some item and the user say that the shelf is empty, the feedback is communicated to the administrator for reconciliation of items and the neighboring markers update the information redirecting upcoming user through a proper conversation and suggesting them to either get an alternative or to notify the person in-charge to support the user.

The embodiments of present disclosure herein provide the telepresence robot which can interact with the one or more users and provide a video conferencing environment in which any user can control, view and interact with other users. The telepresence robot can be controlled from anywhere remotely. The one or more users of the telepresence robot can initiate commands in a voice mode to control. The telepresence robot provides an autonomous navigation and intelligent localization-based event management. The event management corresponds to activity to be performed by the telepresence robot at a particular location. For example, the activity may be "To talk about quantum computing with some examples at one point" and similarly "To perform an OCR based customer case study discussion at other point". The telepresence robot includes an intelligent localization capability to detect a location with at least one live marker and associated information, and present a specific content or follow a presenter. The telepresence robot would be able to do a presentation using an inbuilt memory stored data or from the cloud. The telepresence robot can follow a person using an image and face detection algorithm.

The embodiments of the present disclosure herein include a location awareness feature which is enabled to move inside a closed area and identify at least one specific zone while in a presentation mode. The location awareness is through a location of the at least one live marker and a global positioning system (GPS). Also, using the image processing techniques, a position is adjusted based on a specific zone by looking at a presentation artifact. The telepresence robot includes an ability to provide information about a zone and start with enabling the presentation broadcasting or provide associated with a presentation data based on the feed. Based on type of the event, the telepresence robot includes a capability to pre-map area and provide only required information for the presentation happening for the period. Each zone includes a unique identifier to understand exact location for the at least one zone. For example, if the telepresence robot is in a covid ward in the hospital which exactly knows a protocol to be followed and a delivery information, whereas in non-covid wards follows a different protocol. The telepresence robot can enable itself and intelligently deliver the presentation for the event. The telepresence robot can be controlled by anyone with proper authentication credentials and the manual mode provide an interactive feature of the telepresence robot enabled. The telepresence robot is voice enabled and so can intelligently answer any queries.

The telepresence robot can be used in conference meetings to represent an attendee who could not be part of a meeting and can be controlled by the person at another location in a remote manner. A content which is to be articulated by the attendee can be fed to the telepresence robot, which speaks out as required. The telepresence robot also be able to act as a dynamic presentation generator based on one or more queries that are being posed over a period. Also, the telepresence robot can be used to showcase presentations that are placed in places like business centers.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, via one or more hardware processors, a plurality of images from an image capturing device connected to a telepresence robot;
processing, via the one or more hardware processors, the plurality of images to identify a plurality of live markers in a path of the telepresence robot;
decoding, via the one or more hardware processors, a binary matrix to identify at least one identifier (ID) associated with at least one live marker of the plurality of live markers;
identifying, via the one or more hardware processors, a plurality of parameters based on the at least one identifier (ID) associated with the at least one live marker, wherein the plurality of parameters corresponds to at least one of: (a) a size, (b) a location, or (c) an orientation; and
dynamically localizing, via the one or more hardware processors, a further path to navigate the telepresence robot in response to determining a change in the live marker resulting in change in the orientation of the telepresence robot, followed by communicating information associated with the change in the orientation to at least one neighboring marker among the plurality of live markers, to dynamically change at least one live marker content, resulting in further navigation of the telepresence robot in a desired direction, wherein the at least one live marker content are communicated though alphanumeric information being decoded with a lookup table from a cloud.

2. The processor implemented method as claimed in claim 1, wherein the binary matrix corresponds to a location of the at least one live marker in a static map, and wherein the static map is a usual path map for navigation of the telepresence robot.

3. The processor implemented method as claimed in claim 1, wherein the orientation and a position of the plurality of live markers is received in the telepresence robot by an electronic paper display of a plurality of display marker units.

4. The processor implemented method as claimed in claim 1, wherein the at least one live marker changes at least one content to orient the telepresence robot into a required trajectory, and wherein the associated marker contents correspond to at least one: (a) information regarding the path, (b) activity mapping, and (c) information to process on next location.

5. The processor implemented method as claimed in claim 1, wherein the telepresence robot is a differential robot that navigates based on a difference in a plurality of velocities between two drive wheels.

6. The processor implemented method as claimed in claim 3, further comprising, communicating, via the one or more hardware processors, a request to the plurality of display marker units to triangulate a location of the telepresence robot, using a received signal strength indicator value (RSSI) for a wireless link between the plurality of live markers and the telepresence robot, wherein at least three display marker units is configured to compute location of the telepresence robot.

7. The processor implemented method as claimed in claim 1, wherein a failure detection in the plurality of display marker units enables the at least one neighboring live marker to redirect a motion plan and a content flow of the telepresence robot to an alternate path computed based on a plurality of constraints, and wherein the plurality of constraints corresponds to at least one of (a) an interaction results, and (b) an optimal distance to be travelled between the plurality of display marker units.

8. A system comprising:
a memory storing instructions;
one or more communication interfaces; and
one or more hardware processors coupled to the memory via the one or more communication interfaces, wherein the one or more hardware processors are configured by the instructions to:
receive a plurality of images from an image capturing device connected to a telepresence robot;
process the plurality of images to identify a plurality of live markers in a path of the telepresence robot;
decode, a binary matrix to identify at least one identifier (ID) associated with at least one live marker of the plurality of live markers;
identify a plurality of parameters based on the at least one identifier (ID) associated with the at least one live marker, wherein the plurality of parameters corresponds to at least one of: (a) a size, (b) a location, or (c) an orientation; and
dynamically localize a further path to navigate the telepresence robot in response to determining a change in the live marker resulting in change in the orientation of the telepresence robot, followed by communicating information associated with the change in the orientation to at least one neighboring marker among the plurality of live markers, to dynamically change at least one live marker content, resulting in further navigation of the telepresence robot in a desired direction, wherein the at least one live marker content are communicated though alphanumeric information being decoded with a lookup table from a cloud.

9. The system as claimed in claim 8, wherein the binary matrix corresponds to a location of the at least one live marker in a static map, and wherein the static map is a usual path map for navigation of the telepresence robot.

10. The system as claimed in claim 8, wherein the orientation and a position of the plurality of live markers is received in the telepresence robot by an electronic paper display of a plurality of display marker units.

11. The system as claimed in claim 8, wherein the at least one live marker changes at least one content to orient the telepresence robot into a required trajectory, and wherein the associated marker contents correspond to at least one: (a) information regarding the path, (b) activity mapping, and (c) information to process on next location.

12. The system as claimed in claim 8, wherein the telepresence robot is a differential robot that navigates based on a difference in a plurality of velocities between two drive wheels.

13. The system as claimed in claim 10, wherein the one or more hardware processors are further configured by the instructions to: communicate a request to the plurality of display marker units to triangulate a location of the robot, using a received signal strength indicator value (RSSI) for a wireless link between the plurality of live markers and the telepresence robot, wherein at least three display marker units is configured to compute location of the telepresence robot.

14. The system as claimed in claim 8, wherein a failure detection in the plurality of display marker units enables the at least one neighboring live marker to redirect a motion plan and a content flow of the telepresence robot to an alternate path computed based on a plurality of constraints, and wherein the plurality of constraints corresponds to at least one of (a) an interaction results, and (b) an optimal distance to be travelled between the plurality of display marker units.

15. One or more non-transitory machine-readable information storage mediums comprising one or more instructions which when executed by one or more hardware processors cause:
   receiving, a plurality of images from an image capturing device connected to a telepresence robot;
   processing, the plurality of images to identify a plurality of live markers in a path of the telepresence robot;
   decoding, a binary matrix to identify at least one identifier (ID) associated with at least one live marker of the plurality of live markers;
   identifying, a plurality of parameters based on the at least one identifier (ID) associated with the at least one live marker, wherein the plurality of parameters corresponds to at least one of: (a) a size, (b) a location, or (c) an orientation; and
   dynamically localizing, a further path to navigate the telepresence robot in response to determining a change in the live marker resulting in change in the orientation of the telepresence robot, followed by communicating information associated with the change in the orientation to at least one neighboring marker among the plurality of live markers, to dynamically change at least one live marker content, resulting in further navigation of the telepresence robot in a desired direction, wherein the at least one live marker content are communicated though alphanumeric information being decoded with a lookup table from a cloud.

16. The one or more non-transitory machine-readable information storage mediums as claimed in claim 15, wherein the binary matrix corresponds to a location of the at least one live marker in a static map, and wherein the static map is a usual path map for navigation of the telepresence robot, and wherein the telepresence robot is a differential robot that navigates based on a difference in a plurality of velocities between two drive wheels.

17. The one or more non-transitory machine-readable information storage mediums as claimed in claim 15, wherein the orientation and a position of the plurality of live markers is received in the telepresence robot by an electronic paper display of a plurality of display marker units.

18. The one or more non-transitory machine-readable information storage mediums as claimed in claim 15, wherein the at least one live marker changes at least one content to orient the telepresence robot into a required trajectory, and wherein the associated marker contents correspond to at least one: (a) information regarding the path, (b) activity mapping, and (c) information to process on next location.

19. The one or more non-transitory machine-readable information storage mediums as claimed in claim 17, further comprising, one or more instructions which when executed by one or more hardware processors cause: communicating, a request to the plurality of display marker units to triangulate a location of the telepresence robot, using a received signal strength indicator value (RSSI) for a wireless link between the plurality of live markers and the telepresence robot, wherein at least three display marker units is configured to compute location of the telepresence robot.

20. The one or more non-transitory machine-readable information storage mediums as claimed in claim 15, wherein a failure detection in the plurality of display marker units enables the at least one neighboring live marker to redirect a motion plan and a content flow of the telepresence robot to an alternate path computed based on a plurality of constraints, and wherein the plurality of constraints corresponds to at least one of (a) an interaction results, and (b) an optimal distance to be travelled between the plurality of display marker units.

* * * * *